United States Patent [19]

Hanai et al.

[11] 4,161,364
[45] Jul. 17, 1979

[54] PICTURE PRINTING APPARATUS

[75] Inventors: Yoshimitsu Hanai; Makio Hirata; Mikio Kogane, all of Minami-ashigara, Japan

[73] Assignee: Fuji Photo Film Co., Ltd., Minami-ashigara, Japan

[21] Appl. No.: 848,426

[22] Filed: Nov. 3, 1977

[30] Foreign Application Priority Data

Nov. 4, 1976 [JP] Japan ................................. 51-132933

[51] Int. Cl.² ..................... G03B 27/58; B65H 19/18
[52] U.S. Cl. .................................... 355/72; 242/58.1
[58] Field of Search ................... 355/72; 242/201, 58, 242/58.1, 58.5, 58.6

[56] References Cited

U.S. PATENT DOCUMENTS

| | | | |
|---|---|---|---|
| 3,582,010 | 6/1971 | Whiteman | 242/58 |
| 3,850,356 | 11/1974 | Abe et al. | 242/58 X |
| 3,873,393 | 3/1975 | Bruck et al. | 242/58.1 X |

Primary Examiner—Richard A. Wintercorn
Attorney, Agent, or Firm—Sughrue, Rothwell, Mion, Zinn and Macpeak

[57] ABSTRACT

A picture printing apparatus has a supply magazine section which accommodates a plurality of roll papers. The roll papers are carried by an endless belt which successively positions the roll papers to be fed to the exposure section of the printing apparatus. The end of a roll is detected to cause a new roll to be brought into the feeding position. At the same time, the end of the roll just detected is clamped so that the beginning of the next roll can be connected to it. Once the connection is accomplished, the paper is released so that the newly positioned roll paper can be continuously fed to the exposure section. An exhausted roll can be replaced on the endless belt without interruption of the printing operation.

4 Claims, 6 Drawing Figures

PICTURE PRINTING APPARATUS

BACKGROUND OF THE INVENTION

This invention relates to picture printing apparatuses (hereinafter referred to as "printers" when applicable), and more particularly to a printer which is capable of accommodating a plurality of roll papers and comprises means for connecting these roll papers.

A conventional printer comprises a cassette type magazine which can be detachably mounted therein or a supply magazine fixedly secured to the printer body and capable of loading papers in a light room; however, each of these magazines can accommodate only one roll of paper. Therefore, the conventional printers suffer from the following disadvantages:

In the former detachable magazine, if the papers are loaded in a plurality of magazines in advance, the time required for replacing the papers can be shortened. However, the loading of the papers must be carried out in a dark room, and in addition it is necessary that the magazines thus loaded with the papers be carried to the printer. Therefore, if the size of the roll paper is relatively large, it takes a great deal of labor. Furthermore, as the printer's processing capability is increased, the frequency of replacing the magazines is increased. Accordingly, sometimes a great number of magazines must be provided, which requires a great deal of labor. Also, the use of the conventional detachable cassette type magazines can be uneconomical in view of the space occupied thereby.

In the latter magazine fixedly secured to the printer body, labor in carrying the magazines can be reduced because the loading of the paper can be carried out in a light room; however, it takes a lot of time to replace the papers therein, which leads to a reduction in working efficiency of the priner.

SUMMARY OF THE INVENTION

Accordingly, an object of this invention is to eliminate the above-described drawbacks accompanying conventional printers.

This object can be achieved by enabling the printer to accommodate a plurality of roll papers by providing a device adapted to successively connect these papers.

According to this invention, the loading of papers can be carried out in a light room, it is unnecessary to carry the magazine, and it is possible to replace the paper with a new one during the operation of the printer. Therefore, the working efficiency of the printer is scarcely reduced by the replacement of paper, and the loss of time required for loading the paper is reduced to 1/5-1/10 of that encountered by the conventional printer. Thus, the working efficiency can be remarkably improved. Furthermore, in the case of processing a roll of negative film obtained by connecting negative films in the form of a long belt, the length of the roll paper is substantially infinite and the printing process can be achieved laying emphasis on the roll of negative film. Therefore, a test development with a small amount of roll paper can be eliminated, and accordingly the loss of paper is reduced. A batch of negative films can be selected most effectively in the printing process. Thus, the present invention can provide a number of merits.

BRIEF DESCRIPTION OF THE DRAWINGS

The invention will be described in detail with reference to the accompanying drawings, in which.

DESCRIPTION OF THE PREFERRED EMBODIMENT

Figure 1:
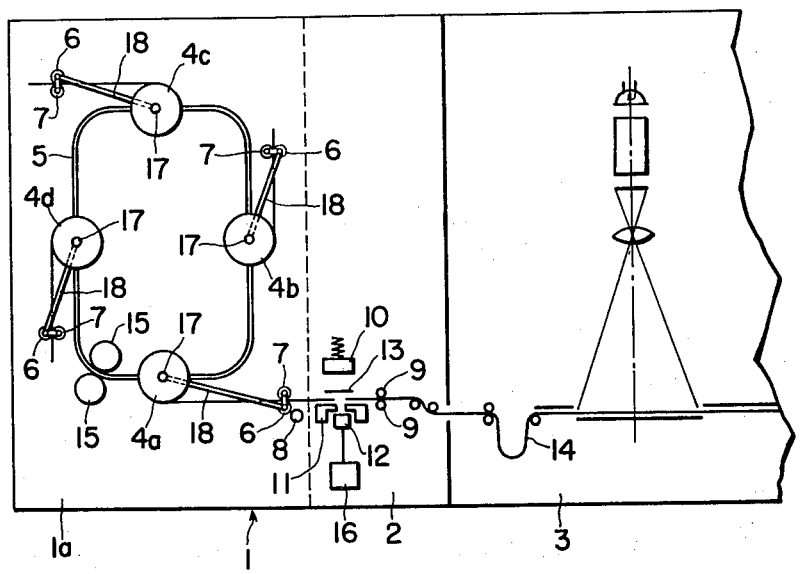
FIG. 1 is a side view of a picture printing apparatus showing one embodiment of the invention.

Referring now to FIG. 1 of the drawings, a supply magazine section 1 is so designed that a plurality of roll papers 4a, 4b, 4c and 4d can be loaded in a light room. More specifically, the supply magazine section 1 comprises a section 1a for accommodating a plurality of roll papers 4a, 4b, 4c and 4d and a connecting device section 2 for connecting the end of a previously loaded paper 14 to the end of a newly loaded roll paper 4. The roll paper accommodating section 1a comprises a conveying means in the form of an endless belt 5 having four roll paper supporting members or shafts 17 for carrying the roll papers 4a, 4b, 4c and 4d, and a driving mechanism 15 for the endless belt. The roll paper accommodating section 1a is operated by a relay 16 operated by a paper finish signal supplied thereto from a paper finish detector 12, thereby to feed the roll paper successively to its loading position. Each of the roll paper supporting members 4a through 4d is provided with a pair of nip rollers 6 and 7 through a supporting rod 18 at a predetermined position. When the roll paper supporting member is brought to the loading position (which is indicated by 4a in the figure), the roller 6 engages a driving roller 8 to feed the roll paper. The roll paper connecting device section 2 is made up of a thermal connecting device having a heater block 10 and a receiving stand 11, and a pair of brake rollers 9. The roll paper connecting device section 2 is operated by a relay 16 which is operated by the signal supplied from the paper finish detector 12, in such a manner that while the pair of brake rollers 9 clamp the end portion of the previously loaded paper, the end portion of a newly loaded paper is fed into the connecting device section 2, whereby these two end portions are thermally connected together with a bonding tape 13.

Figure 2:
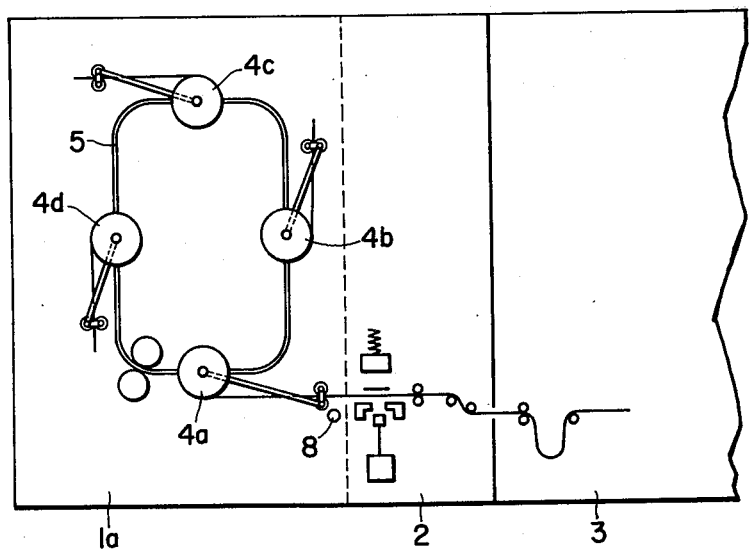
FIGS. 2 to 4 are partial side views illustrating the operating conditions of the picture printing apparatus.
Figure 3:
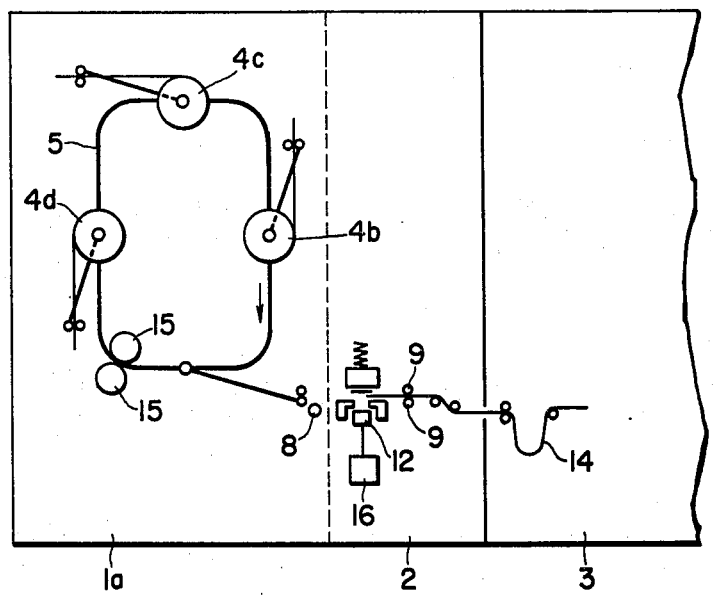
Figure 4:
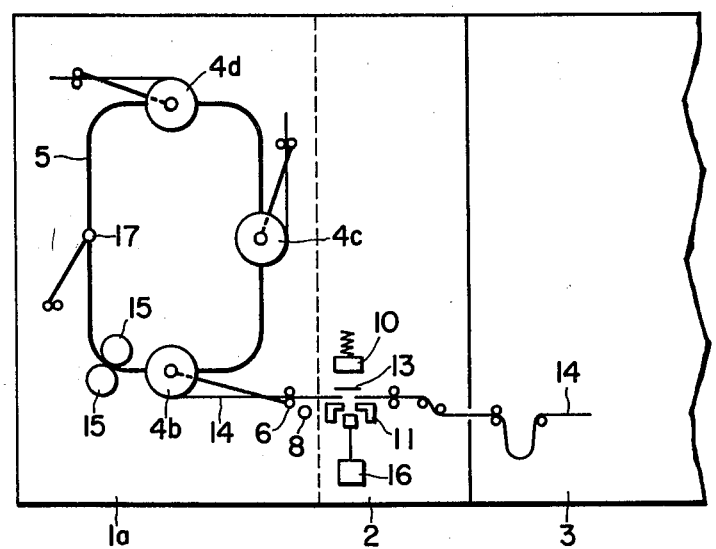
Figure 5:
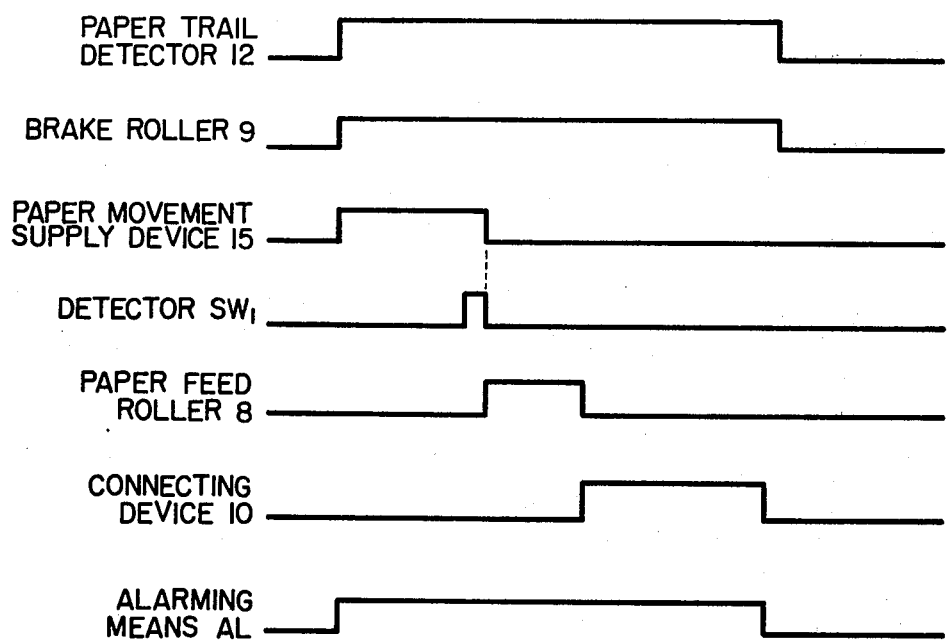
FIG. 5 is a time chart explaining the operating conditions thereof.
Figure 6:
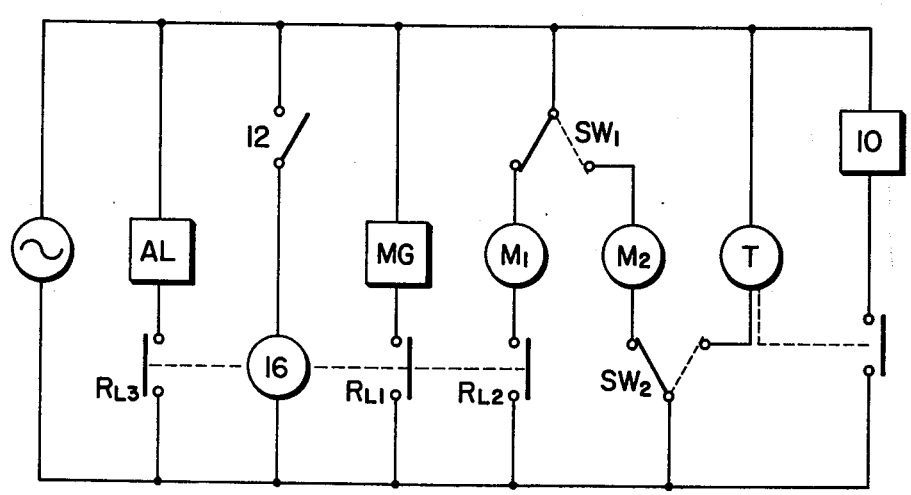
FIG. 6 is a circuitary diagram adpated to use in the embodiment of the invention.

The roll paper connecting process is shown in FIGS. 2 through 4. FIG. 2 shows a state of the printing apparatus in which the roll paper at the position 4a is fed to the printer. FIG. 3 shows a state of the printing apparatus in which the printing operation of the roll paper 4a is finished. FIG. 4 shows a state of the printing apparatus where the two end portions of papers are connected together. FIG. 5 shows a time chart explaining the above operation conditions. FIG. 6 is a circuitry diagram adapted to used in this embodiment. Referring to FIG. 3 in conjunction with FIG. 6, when the feeding of the roll paper 4a is finished, the paper detector 12 detects the paper finish signal and the relay 16 is operated in response thereto. When the relay 16 is operated, the contacts $R_{L1}$ and $R_{L2}$ are simultaneously closed. As a result, an electromagnet MG for activating the pair of brake rollers 9 is operated so as to fix the trailing end of the paper 14 at the predetermined position where the paper connection is effected, and a motor $M_1$ for driving the driving device 15 is driven so that the roll paper 4b is moved to the position where the roll paper 4a was, the roll paper 4c is moved to the position where the roll paper 4b was, and so on. When the roll paper 4b is set at the paper feeding position, the roller 6 engages with the driving roller 8. This engagement is detected by a detector $SW_1$. The detector $SW_1$ provides a function to stop the rotation of the motor $M_1$ and to drive a motor $M_2$ for driving the roller 8 simultaneously therewith, so that the leading end of the paper is fed at the predetermined position on the connecting device. Next, a timer T is operated for a certain period of time, during which the connecting device operates. In this connecting operation, a predetermined amount of bonding tape 13 is supplied, and the heater block 10 is moved downward to compress the paper and the bonding tape between the receiving stand 11 and the heater block thus moved. Then current is applied to the heater block to connect the papers with the bonding tape. Such connecting device is conventionally known. Upon completion of the paper connection, the brake rollers 9 are released, and simultaneously the heater block is returned to its initial position. Thus, the paper connecting operation is completed. Since the contact $R_{L3}$ of the relay 16 is opened during the paper connection, an alarming means AL is operated to alarm that the picture printing cannot be carried out even though the printing operation switch is operated.

The method of automatically connecting papers has been described above. However, if the apparatus is so designed that an alarm signal is generated when the feeding of a roll paper is finished, the paper connection may be carried out manually. Loading the paper is carried out during the printing operation. In this connection, the detection of an idle shaft 17 to be loaded with a roll paper can be readily achieved by externally indicating the idle shaft.

In the above-described apparatus, the paper connecting device is incorporated in the printer body. However, it is possible that the paper connecting device is separated from the printer body and is incorporated in a magazine accommodating a plurality of roll papers, and then the magazine is set in the printer. In this case, the advantage of this invention is that the supply of a long roll paper can be effected with a conventional printer.

What is claimed is:

1. In a picture printing apparatus for processing a roll of negative film, of the type including an exposure section fed with printing paper from a supply section, the improvement wherein said supply section comprises means for supporting and successively conveying a plurality of roll papers to be fed to said exposure section, and means for successively connecting the ends of said roll papers as they are fed to said exposure section, whereby the length of the roll paper is substantially infinite and the printing process can be performed continuously for the entire length of each roll of negative film.

2. The improvement recited in claim 1 wherein said means for supporting and conveying comprises a conveying means carrying a plurality of roll paper support members, a pair of nip rollers provided for each roll paper supporting member for supporting the end portion of a roll paper, and a driving roller for engaging said pair of nip rollers when a roll paper is conveyed to a position to be fed to said exposure section.

3. The improvement recited in claim 1 further comprising means for detecting the end of a roll paper being fed to said exposure section.

4. The improvement recited in claim 3 further comprising clamping means responsive to said means for detecting for clamping the detected end of a roll paper being fed to said exposure section until the beginning of the next roll paper is connected thereto.

* * * * *